Nov. 25, 1969
R. A. WHITLOCK
3,480,041
TIMER CONTROLLED WATER SOFTENER VALVE
Filed Aug. 23, 1965
3 Sheets-Sheet 1
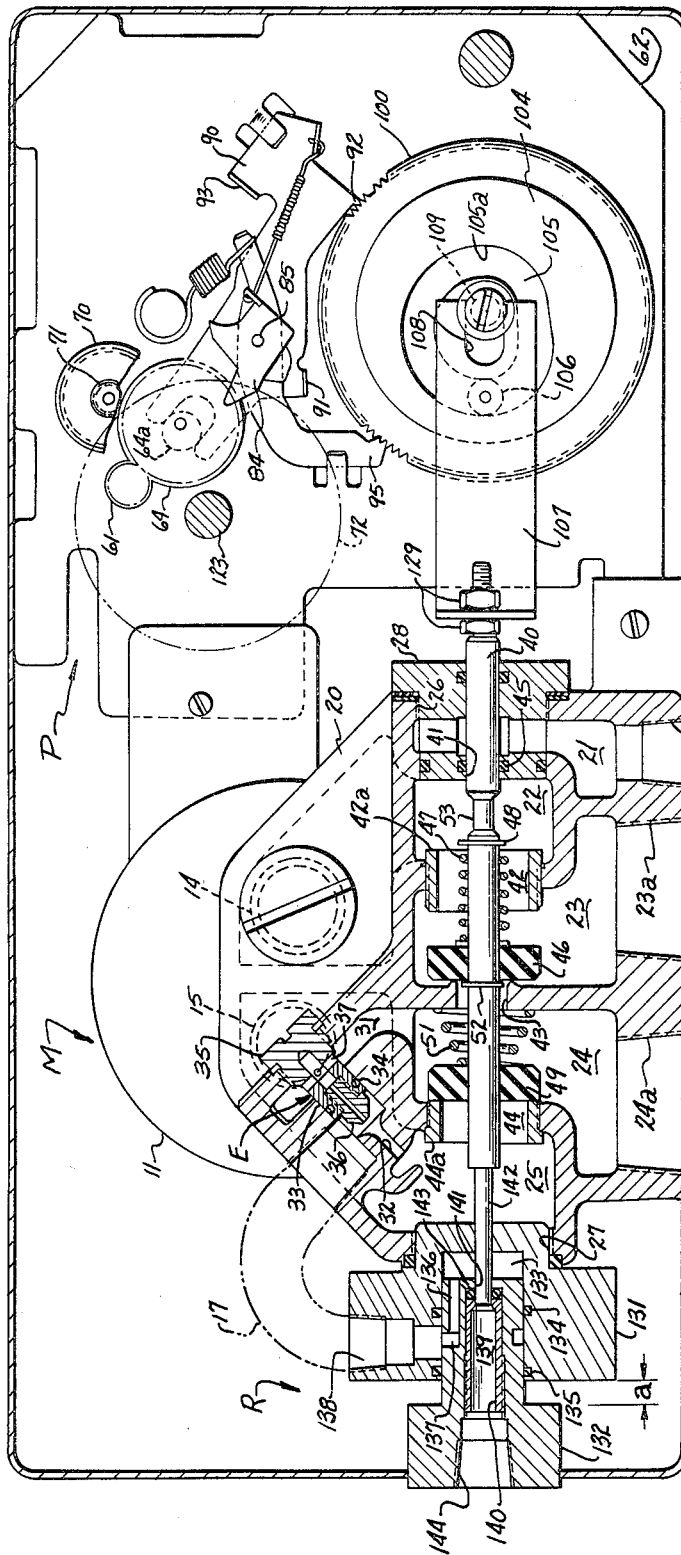
Inventor
Robert A. Whitlock
By
McCanna, Morsbach & Pillote
Attorneys

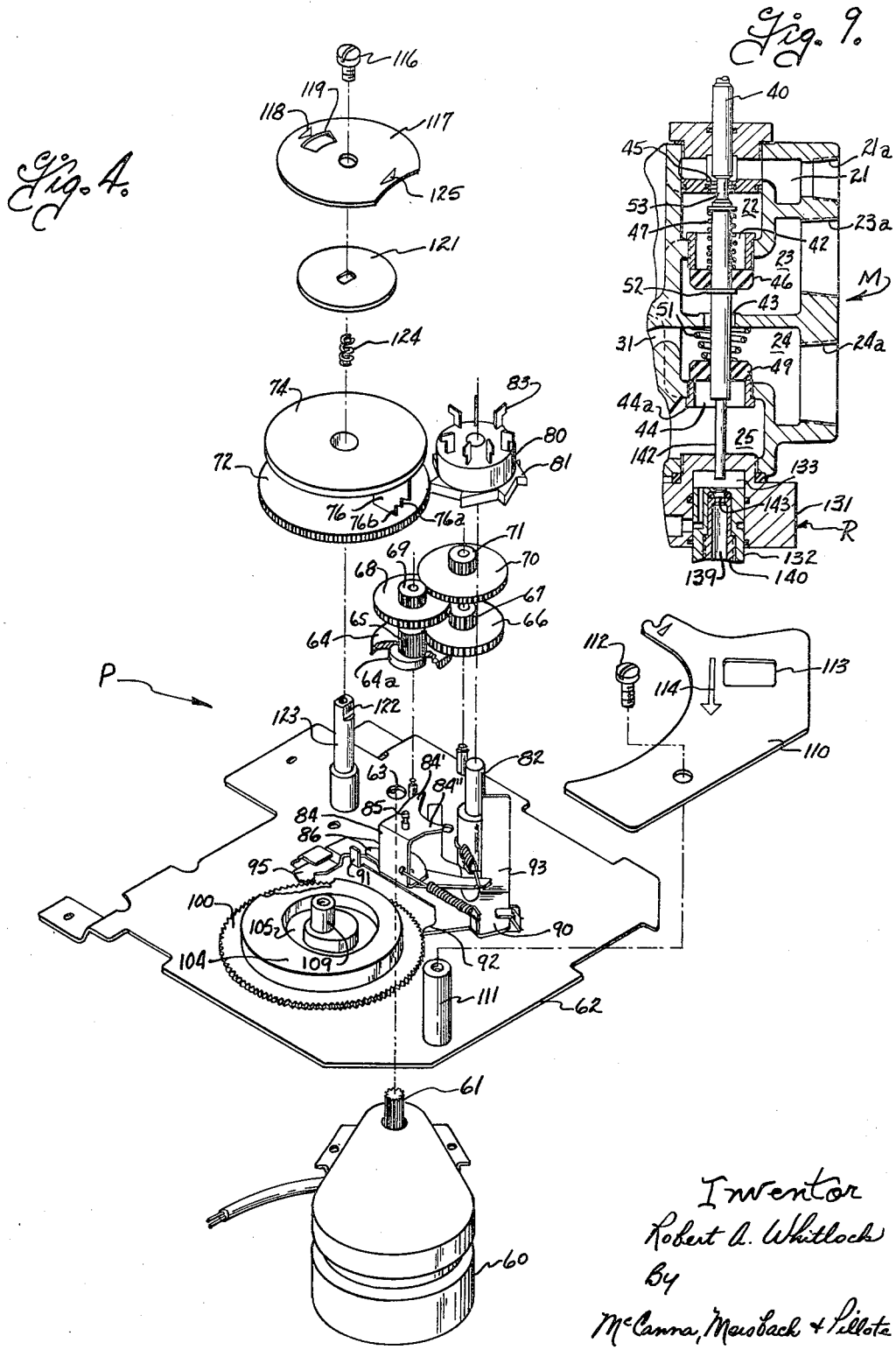

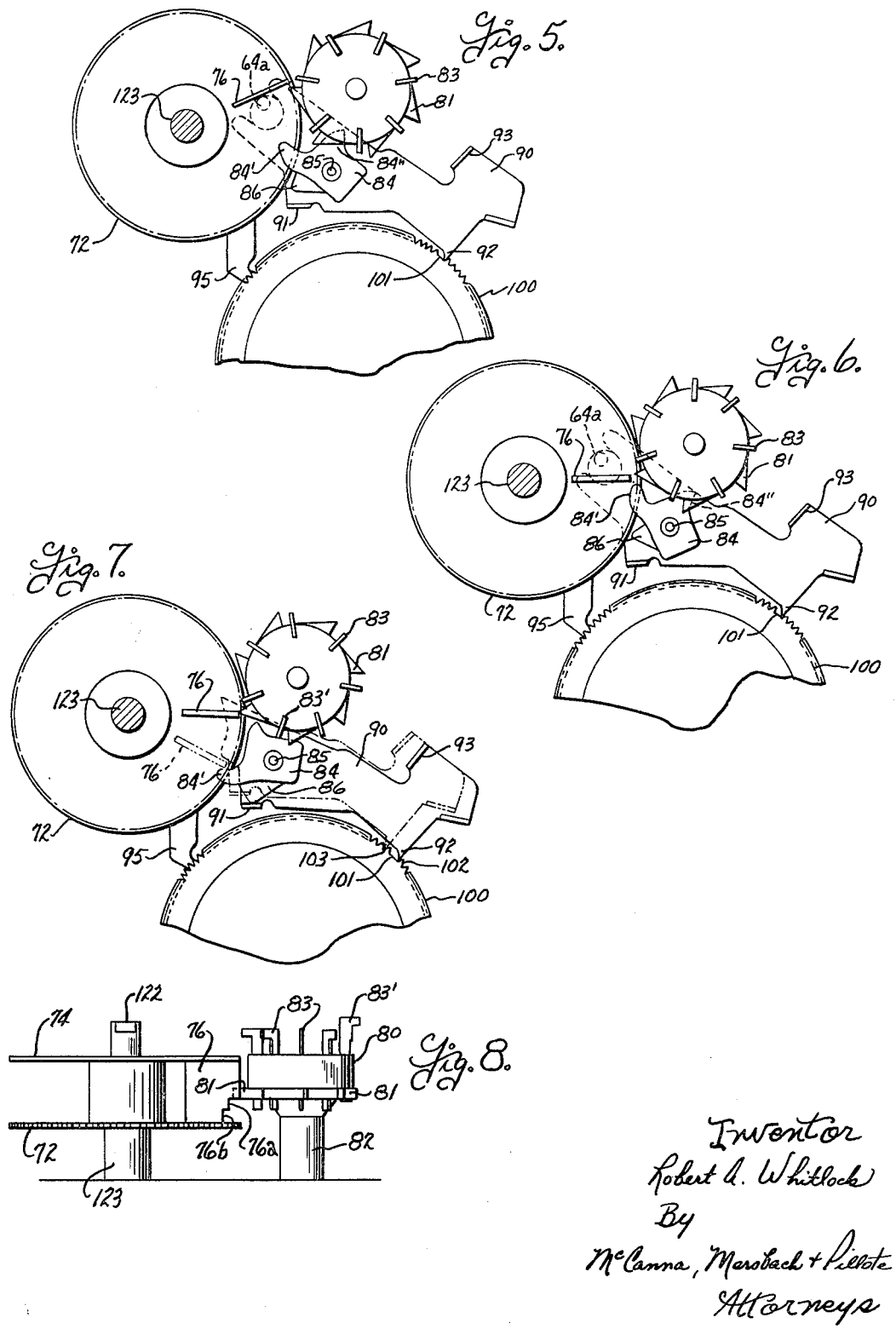

United States Patent Office 3,480,041
Patented Nov. 25, 1969

3,480,041
TIMER CONTROLLED WATER SOFTENER VALVE
Robert A. Whitlock, Rockford, Ill., assignor to Aqua-Matic Inc., Rockford, Ill., a corporation of Illinois
Filed Aug. 23, 1965, Ser. No. 481,718
Int. Cl. G04c 23/26; G05d 7/06
U.S. Cl. 137—624.2                            21 Claims

ABSTRACT OF THE DISCLOSURE

A multiport valve and a valve element therein which is movable between two extreme positions. A program clock is provided which includes a synchronous motor and a time indicator driven by the motor. A mechanical drive is interposed between the time indicator and the valve element and connected to the valve element for driving the same between its positions. Presettable means is provided for periodically engaging the time indicator with the mechanical drive to drive the valve element so that the synchronous motor is the prime mover for the valve element. A regenerant valve is mounted on the multiport valve and the valve element controls the flow through the regenerant valve.

---

This invention relates in general to flow control apparatus.

Various objects of this invention are to provide a new flow control apparatus including a timer, a main valve, and a regenerant valve and which is compact and economically manufactured.

Another object is to provide a new multiport valve for a fluid treatment system for controlling the various flows through the system during successive phases of a cycle including service, regeneration, and rinsing of the bed of exchange material.

Still another object of this invention is to provide new valve controls including a timing motor and actuating means wherein the timing motor is the power source for the actuating means.

Yet another object is to provide a new multiport valve and valve controls in which the valve element is adapted to be moved relatively slowly between its various operative positions to allow normal pressure to be restored throughout the valve and thereby permitting actuation by a substantially small timing motor.

A further object of this invention is to provide a regenerant valve adapted to be operated by the same actuating means which operates the main valve.

A still further object is to provide a regenerant valve in accordance with the foregoing object and which has valve means operatively connected to the valve means of the main valve for movement therewith.

A yet further object is to provide a new regenerant valve which is arranged to open for withdrawal of fluid from the regenerant tank and to control refill of the regenerant tank through the same conduit.

Another object is to provide a regenerant valve which will maintain a substantially constant rate of refill under wide ranges of pressure.

It is still another object of this invention to provide a regenerant valve which has a valve means controlled by a timing mechanism.

It is yet another object to provide a multiport valve and a regenerant valve in accordance with the foregoing objects which are operatively connected and which are adapted for operation by the motor of the timing mechanism.

These, together with other objects and advantages of this invention will be more readily appreciated as the same becomes better understood by reference to the following detailed description when taken in conjunction with the accompanying drawings wherein:

FIG. 1 is an elevational view of an embodiment of this invention enclosed in a housing and mounted on a fluid treatment tank and with a portion of the housing broken away to better illustrate the main valve and regenerant valve;

FIG. 2 is a top view of the embodiment shown in FIG. 1, again having a portion of the housing broken away to better illustrate the conduits connected to the valves;

FIG. 3 is a horizontal sectional view taken generally along line 3—3 of FIG. 1;

FIG. 4 is an exploded perspective view of the timing and actuating mechanism;

FIGS. 5–7 are partial top views of the timing and actuating mechanism showing various move positions to illustrate the operation of the idler and the actuation for starting an operating cycle, and having some parts removed for better illustration;

FIG. 8 is an elevational view of a portion of the timing mechanism; and

FIG. 9 is a partial view of the main valve and regenerant valve showing the relative positions of the parts during regeneration.

Reference is now made more specifically to the drawings wherein like reference characters indicate like parts throughout the several views. The present invention includes a main valve, generally designated by M, a regenerant valve, generally designated by R, and a program clock, generally designated by P, as illustrated in FIG. 3. These components are advantageously interconnected and interrelated to form a flow control apparatus for use in a water treatment system, for example. A water treatment system employing the control apparatus of the present invention is more or less diagrammatically shown in FIG. 2 and includes a treatment tank TT and a regenerant tank RT. Main valve M is conveniently mounted directly to the treatment tank TT by means of a threaded cap 11 (FIG. 1) and the regenerant valve R is connected to regenerant tank RT by means of conduit 12 (FIG. 2). Threaded cap 11 has a pair of ports 14 and 15 communicating with opposite ends of the treatment tank TT. In the embodiment shown, a conduit 16 (FIG. 1) communicates with port 15 and extends to a point adjacent the bottom of tank TT conveniently providing a lower tank connection below the bed of exchange material (not shown) and a short conduit or screen 13 communicates with port 14 to prevent loss of the exchange material. As shown in FIGS. 1–3, the control apparatus of the present invention may conveniently be enclosed in a housing H to provide an attractive unit.

THE MAIN VALVE

As shown in FIG. 3, the main valve M comprises a casing 20 having a plurality of cavities or chambers 21–25 and which are advantageously arranged with at least a portion of each cavity in axial alignment for reasons which will become apparent. The first chamber 21 has a drain passage 21a communicating therewith and which is adapted for receiving a drain line 21b, as shown in FIG. 2. The second chamber 22 communicates with fluid outlet passage or port 14 in cap 11. Third chamber 23 has a fluid inlet passage 23a adapted for connecting to a raw water supply line 23b. Likewise, fourth chamber 24 has a service outlet passage 24a adapted for connecting to a service line 24b. Fifth chamber 25 communicates with treated fluid inlet or port 15 communicating with the bottom of tank TT by means of conduit 16. While it is contemplated that the ejector, generally designated by E (FIG. 3), may be mounted on a separate unit, it is herein illustrated as conveniently mounted on the casing 20 and having an inlet communicating with the fourth chamber by means of passage 31 and an outlet communicating with the fifth chamber by means of passage 32. The ejector may be of any suitable construction well known to those skilled in the art and, in the present embodiment, includes a body 33 insertable into a bore in the casing 20 and which is conveniently sealed thereto by O-ring 34 and detachably retained in position by a threaded cap 35. The body 33 is conveniently hollow and receives a nozzle 36 having a restricted opening therein for passing a stream of raw water through the passage 32, thereby producing a low pressure at the inlet thereto. The body 33 has a plurality of raw water inlet openings 37 communicating with passage 31 for supplying raw water to the nozzle during regeneration. A regenerant line 17 communicates with the inlet side of passage 32 and the aforesaid low pressure draws regenerant therethrough during regeneration of treatment tank TT.

Main valve casing 20 has a plurality of ports 41–44 therein. Port 41 provides communication between chambers 21 and 22; port 42 provides communication between chambers 22 and 23; port 43 provides communication between chambers 23 and 24; and port 44 provides communication between chambers 24 and 25. Ports 41, 42, and 43 are preferably axially aligned and port 44 is conveniently aligned therewith. Sleeves 42a and 44a are conveniently inserted into ports 42 and 44, respectively, to provide valve seats therefor. To provide for the insertion of sleeves 42a and 44a, casing 20 conveniently has openings 26 and 27 at opposite ends. After assembly, opening 27 may be closed in any convenient manner as by a cap (not shown) or, in the embodiment illustrated, by mounting brine valve B therein. Utilizing opening 27 as a mounting for brine valve B has an additional advantage which will be hereinafter described. Opening 26 is closed by a closure 28 conveniently having means describing a portion of cavity 21 and means describing port 41. A single valve element 40 passes through closure 28 and ports 41 and 42. Valve element 40 also conveniently passes through ports 43 and 44 for purposes which will become apparent.

Service position of the valve is shown in FIG. 3. In this position, port 41 is closed by means of an O-ring 45 engaged with the port and the valve element 40, thereby blocking flow between chambers 21 and 22. A valve means in the form of resilient member 46 is mounted on the valve element 40 and blocks flow through port 43. Resilient member 46 is urged toward this position by means of a spring 47 engaged therewith at one end and engaged at the other end with a stop 48 mounted on the valve element 40. Spring 47 and stop 52 are arranged to provide a small amount of lost motion when the valve element moves to regenerant position, hereinafter described, and to provide positive seating of the resilient member 46 over port 43 or port 42. A second valve member 49 is mounted over port 44 and arranged to prevent flow from chamber 24 to chamber 25 but to allow flow in the reverse direction. For this purpose, resilient member 49 is conveniently mounted on valve element 40 to center the same over port 44 and is advantageously urged against the valve seat 44a by means of a spring 51. In service position of the main valve M, raw water, entering through pipe 23b and inlet 23a, flows through chamber 23, port 42, chamber 22, and port 14 to the top of treatment tank TT. The raw water is treated by downward flow through the bed of exchange material in tank TT, and then the treated water is withdrawn through conduit 16 and port 15 into chamber 25. When there is a pressure drop in chamber 24, as by opening a water tap, the water pressure in chamber 25 causes valve 49 to open. This allows the treated water to flow through port 44 into chamber 24 and thence to service through outlet 24a and pipe 24b.

The regeneration position of valve element 40 is shown in FIG. 9. In this regeneration position, resilient member 49 still closes port 44 to prevent flow from chamber 24 to chamber 25. Resilient member 46 is engaged by stop 52 and moved to a position closing port 42 to prevent flow between chambers 23 and 22. A dentation 53 in valve element 40 has been moved to a position adjacent to O-ring 45 thereby allowing flow from chamber 22 to chamber 21. In this position of the valve element, chambers 23 and 24 are communicated whereby service is provided by raw water entering chamber 23 through pipe 23b and inlet 23a. This raw water is free to flow to chamber 24 and provide service water through pipe 24b. This raw water is also forced through passage 31 to ejector E. There it flows through openings 37 and nozzle 36 to throat or passage 32 communicating with chamber 25. As stated above, the nozzle 36 causes a low pressure at the inlet to passage 32 and this withdraws regenerant through regenerant line 17. This combination of raw water and regenerant flows through chamber 25, port 15, and conduit 16 to the bottom of treatment tank TT for regenerating the exchange material in the treatment tank. The effluent flows through port 14 to chamber 22 and from there through port 41 to drain chamber 21 and out through drain line 21b. After a period of time, the prescribed amount of regenerant is withdrawn and then only raw water flows through the treatment tank in the same manner, thus providing a rinse of the material therein. After regeneration and rinse are completed, the valve is returned to its first position to again provide service of treated or softened water to line 24b. To provide for movement of the valve element 40 between the aforesaid positions, the element conveniently extends outside of casing 20 for engagement with an actuating means.

PROGRAM CLOCK

The main valve described above is advantageously driven by the same motor which times the regeneration cycle. The apparatus which performs this function is a program clock P shown in an exploded view in FIG. 4. This is one embodiment of the invention, shown here by way of illustration, but it can be embodied in a number of other specific constructions having similar principles. As shown, a constant running synchronous motor 60 with reduction gears (not shown) drives a motor pinion 61. While it is contemplated that various sized synchronous motors may be utilized, the motor illustrated in FIG. 3 is rated at 4.5 watts at 115 volts and drives motor pinion 61 at 4 r.p.m. This motor is conveniently mounted beneath base plate 62 and motor pinion 61 extends through hole 63 in the base plate. Motor pinion 61 engages a cam drive gear 64 on which is affixed a cam 64a for providing reciprocal movement to index lever 90, as shown in FIG. 3. Cam drive gear 64 is conveniently arranged to run at two-thirds r.p.m. Through further reductions, accomplished by gears 65–71, gear 72 is arranged to make one revolution in 24 hours, as is clock dial 74 attached thereto. In assembled position, gear 71 engages gear 72.

A plow 76 is arranged between gear 72 and clock dial 74 and has clearance notches 76a and 76b, as best shown in FIG. 8. This plow moves with gear 72 and clock dial 74, thus making one revolution each 24 hours. The plow advances day wheel 80 one position each revolution, or 24 hours, by engaging the respective teeth 81 (FIG. 8). The day wheel 80 illustrated is in the form of a 7-day wheel, having one stop or tooth for each day of the week; however, it is contemplated that other day wheels may be utilized as, for example, a twelve-day wheel. The day wheel is conveniently rotatably mounted on shaft 82 by any convenient means and has a tooth 81 corresponding to each day on the day wheel. For each day there is a slide 83 which is movable between an "out" and an "in" position. As illustrated in FIG. 8, slide 83 is at the "in" position and slide 83′ is at the "out" position, whereby its lower extremity is disposed inside day wheel 80. At the "in" position, each slide becomes a plow which engages a start lever 84 in the manner shown in FIGS. 5 and 6. Start lever 84 has an arm 84′ positioned for engagement by notch 76a of plow 76, in the manner shown in FIG. 7. When, however, the slide 83 is left at "in" position, it engages the second arm 84″ of start lever 84 (FIG. 5) and moves the start lever to an *inactive* position whereby first arm 84′ is not engaged by plow 76 (FIG. 6) and no regeneration occurs. Thus, to obtain the desired days for regeneration, the corresponding slide or slides must be pulled to "out" position.

Automatic stat takes place when plow 76 on clock dial 74 rotates start lever 84. When the slide 83′ is pulled to "out" position, the start lever 84 is left in an *active* position for engagement by the plow 76, as shown in FIG. 7. A start lever cam 86, mounted on the start lever 84 is then moved against gear 91 on index lever 90. This pushes the index lever 90 beyond its normal travel, pushing the last tooth 102 *before* the gap or idler 101 and rotates ratchet wheel 100 by the space of one tooth or more. When it drops back, the index lever engages the next tooth on the ratchet wheel 100 *after* the missing tooth or idler 101, and thus starts a rotating cycle of the ratchet wheel. This movement beyond normal travel is illustrated in FIG. 7 and the movement whereby the index lever 90 drops back to engage the next tooth is shown in phantom.

As stated above, index lever 90 is driven by eccentric cam 64a on the bottom of drive gear 64 (FIG. 3) so that it reciprocates slowly. In the embodiment illustrated, the travel of the index lever is approximately ⅛ inch and conveniently has a full cycle time of about 1½ minutes. The upper end of the index lever 90 has a point 92 which engages the teeth on ratchet wheel 100. Thus, as the index lever advances, it moves the ratchet 100 clockwise by the spacing of one tooth each 1½ minutes. When the index lever returns, it drops into and picks up the succeeding tooth, and so on, to produce a slow clockwise rotation of the ratchet wheel 100. A pawl 95 prevents any backward rotation of the ratchet wheel unit.

The ratchet wheel 100 conveniently has 123 teeth and one missing tooth, providing an idler 101. When this gap or idler in the ratchet wheel comes around, the index lever 90 fails to engage the succeeding tooth, and rotation of the ratchet wheel stops. The point 92 of the index lever 90 then idles back and forth in the gap or idler until automatic start or manual start action occurs. It should be noted that one complete rotation of the ratchet wheel takes slightly over 3 hours; however, it is contemplated that other lengths of time may be utilized.

Manual start is accomplished by pressing manual start handle 93 on index lever 90 and then releasing it. This has the same effect, as in automatic start, of moving the index lever upward so it advances the gap in the edge of the ratchet wheel 100 beyond normal position and the index lever picks up the next tooth *after* the gap when it comes up on its next stroke. To aid in this purpose, a direction plate 110 (see FIG. 4) is conveniently provided and mounted on start lever shaft 85 and on shaft 111 by means of fastener 112. Direction plate 110 is provided with an opening 113 through which extends manual start handle 93. An arrow 114 is conveniently provided adjacent opening 113 to indicate the direction the manual start handle should be pushed to effectuate manual start of the actuating mechanism. The words "manual regeneration" may also be provided adjacent to the arrow to further direct the user.

The regeneration time, i.e. the time of day or night when the regeneration cycle is to start, is set by loosening screw 116 (FIG. 4) and turning dial 117 until the desired time, say 3:00 a.m., lines up with mark 118 adjacent window 119, then tightening screw 116. To effectuate its purpose, a regeneration dial 121 is located beneath dial 117 and is conveniently calibrated for the hours of the day so that the regeneration time can be set. The regeneration dial 121 is fixed in position, being secured to key 122 in the top of post 123. When the apparatus is put into operation, it is necessary to set the time of day, and, for this purpose, clock dial 74 is conveniently calibrated for the hours of the day and may also have fractional hour calibrations thereon. The clock dial 74 is arranged so that it can be lifted against holding spring 124 and turned until the actual time of day lines up with mark 125 on dial 117. Clock dial 74 may then be dropped to allow gear 72 to engage gear 71. Then clock dial 74, driven by motors 60 and gear trains, will accurately keep the time and show the actual time of day at mark 125. It is contemplated that marks 118 and 125 may carry additional directions, such as "regeneration time" and "time of day," respectively. From the foregoing, it is deemed obvious that a timing and actuating mechanism can be set to move ratchet wheel 100 at a preselected time on any given day.

It should now be obvious that the program clock is very versatile, being adapted to automatic or manual operation.

The program clock P is preferably arranged to move the valve element 40 of main valve M. For this purpose, a cam 104 is affixed to ratchet wheel 100 in any convenient manner. While it is contemplated that many forms of cams may be utilized, the preferred form illustrated has an internal cam track or slot 105. A cam follower in the form of wheel 106 is secured to arm 107 and arranged to follow cam slot 105, thereby changing the rotary motion to a reciprocal motion of arm 107. To further effectuate this purpose, arm 107 is provided with a slot 108 for engaging shaft 109 on which cam 104 and ratchet wheel 100 are mounted. The other end of arm 107 is conveniently attached to valve element 40 by means of fasteners 129, thereby providing a motion transmitting connection to the valve element. Fasteners 129 are conveniently arranged whereby the distance between the arm 107 and valve element 40 may be adjusted to the most advantageous setting for operation of valve element 40.

From the foregoing it is deemed obvious that movement of the ratchet wheel 100 starts automatically at regeneration time or by manual start and that cam 104 moves therewith. During the cycle of regeneration, the ratchet wheel and cam are continuously rotated and cam track 105 operates to move the valve element 40. To provide a period of time for the regeneration operation, the cam track 105 preferably has a portion 105a (see FIG. 3) which is substantially equidistant from shaft 109 to provide a period of dwell of the valve element in regenerant position.

REGENERANT VALVE

As in an ordinary water treatment system, the ejector E is attached to a regenerant tank RT as by conduits 12 and 17. A regenerant valve is ordinarily interposed in the conduits to open to allow the regenerant to be withdrawn by the ejector, and to close after the regenerant has been withdrawn. Some means has to be provided to effectuate refill of the regenerant tank and to control such refill. This is sometimes accomplished by a separate supply line and separate valve. In the embodiment illustrated, however, both withdrawal and refill are effectuated by the same regenerant valve R in a particularly advantageous manner.

As stated above, regenerant valve R is conveniently mounted on main valve M as in opening 27 thereof. In the embodiment illustrated in FIG. 3, regenerant valve R comprises a body preferably made of two portions designated 131 and 132. The first member 131 has a cavity 133 for receiving member 132 and a pair of O-rings 134 and 135 are conveniently arranged to provide a seal between the first and second members. The second member 132 has a channel 136 for communicating with chamber 133 at one end, and with annular channel 137 at the other end. Annular channel 137 communicates with brine outlet port 138, which is adapted for connection to conduit 17 leading to ejector E. Second member 132 conveniently has a chamber or cavity 139 defined by a bore having a sleeve 140 fitted therein. A port 141 communicates cavity 139 with cavity 133 in first member 131. A valve member or stem 142 extends through port 141 and an O-ring 143 is conveniently provided between sleeve 140 and the body of second member 132 to seal against valve stem 142, thus providing a valve which may be opened or closed by withdrawal or insertion of valve stem 142. Second member 132 has a regenerant inlet port 144 communicating with chamber 139 and adapted for connecting to regenerant line 12. It should be noted that port 141 is conveniently axially aligned with the ports of main valve M and that valve stem 142 is attached to valve element 40 of the main valve for movement therewith. As valve element 40 is moved at the start of a regeneration cycle, valve stem 142 is simultaneously withdrawn from port 141 to a position shown in FIG. 9. This allows the ejector E to withdraw regenerant from the tank RT.

After the prescribed amount of regenerant has been withdrawn from the tank RT, the ejector will draw only air therefrom. An air check valve may be provided in the regenerant tank to prevent the withdrawal of air, however, this is not required in this particular system since the rinse after regeneration is an upflow type rinse and air will not be locked in the exchange material in treatment tank TT by such upflow rinse.

After completion of regeneration and rinsing, valve element 40 is moved back toward the left, as viewed in FIG. 3. Because of the advantageous arrangement of main valve M, the first occurrence is the closing of port 41, thus preventing flow through drain line 21b. At this point, resilient member 46 is between ports 42 and 43 and the pressure throughout the main valve M and treatment tank TT quickly becomes equalized. At this point, also, the low pressure area is in regenerant lines 12 and 17, whereby water is forced through channels 31 and 32 connected with ejector E, and into line 17, through valve R and conduit 12 to tank RT. At this point, therefore, timing of closure of valve stem 142 into sealing relation with O-ring 143 will time a portion of refill of the regenerant tank. The remaining portion of flow to the regenerant tank occurs just prior to withdrawal of the regenerant from the tank RT. As soon as resilient member 46 is moved away from port 43 at the start of regeneration and stem 142 is withdrawn from port 141, raw fluid will flow from chamber 23 through the system to channels 31 and 32 connected with ejector E. In a manner similar to that described above, the fluid will flow to the tank RT until dentation 53 permits flow from chamber 22 to chamber 21. This opens the drain line 21b which causes a low pressure in treatment tank TT and consequently low pressure in throat 32. This starts withdrawal of the regenerant as explained above. Since the interval between withdrawal of stem 142 from port 141 and the opening of port 41 by dentation 53 is timed, this operates to time the other portion of refill of the regenerant tank. Thus, the embodiment of the regenerant valve illustrated also times refill of the regenerant tank.

In ordinary systems which time the refill of the regenerant tank, a flow restrictor is utilized to control the rate of fill. With the embodiment illustrated, however, a flow restrictor is not required since valve R, by its particular structure, has built-in flow restrictor qualities. Experimentation has shown, for example, that an average of about 7 gallons of water will be refilled into tank RT during a cycle of the apparatus and under 60 p.s.i. Under the same conditions, but changing operating pressure to 30 p.s.i., an average of about 5½ gallons of water will be refilled. Thus, it can be seen that valve R operates within the reasonable accuracy found in an ordinary flow restrictor. This restrictive quality may be the result of the turbulence set forth in the particular structure and because the O-ring 143 has a tendency to flatten under higher pressures, thereby restricting the flow through port 141. As a result, valve R effectuates a more or less constant refill of the regenerant tank.

Since it may be necessary, under various conditions, to vary the time in which valve stem 142 engages O-ring 143, means has been provided to accomplish this. Second member 132 is slidable within cavity 133 of first member 131. Thus, the distance designated by *a* may be easily changed to vary the amount of refill required in tank RT. It should be understood that the valve R may be mounted on main valve M at various places thereon or be used at a remote location therefrom. Likewise, stem 142 may be connected directly to arm 107 of the timing and actuating mechanism for operation thereby. This may be done either in conjunction with the operating of valve element 40 or independent thereof.

It is now deemed obvious that the particular combination of the main valve M, regenerant valve R, and a timing and actuating mechanism, best illustrated in FIG. 3, are interrelated and interconnected to provide an advantageous flow control apparatus in a single compact unit.

While I have thus illustrated and disclosed a preferred embodiment of my invention, this has been done by way of illustration and not limitation and I do not wish to be limited except as required by the appended claims.

I claim:

1. A flow control apparatus including casing means defining first, second, third, fourth, fifth, sixth, and seventh chambers; a drain passage communicating with said first chamber, a fluid outlet passage communicating with said second chamber and adapted for connection to a treatment tank, a fluid inlet passage communicating with said third chamber, a service outlet communicating with said fourth chamber, a treated fluid inlet communicating with said fifth chamber, an ejector having an inlet communicating with said fourth chamber and an outlet communicating with said fifth chamber, a regenerant inlet communicating with said seventh chamber and adapted for connection to a regenerant tank, a brine outlet communicating with said sixth chamber and having means communicating with said ejector; first, second, third, fourth, and fifth ports in substantially axial alignment and providing communication between said first and second chambers, between said second and third chambers, between said third and fourth chambers, between said fourth and fifth chambers, and between said sixth and seventh chambers, respectively; a valve stem passing through said ports and extending outside the casing, valve means for blocking flow through said first port when the valve stem is in one position and for permitting flow therethrough when the valve stem is in another position, a third chamber valve means on the valve stem for blocking flow through said third port when the valve stem is in said one position and for blocking flow through said second port when the valve stem is in said other position, and fifth port valve means operable in said one position to prevent flow between said sixth and seventh chambers when the valve stem is in said other position; a rotatable cam means, a cam follower means having a motion transmitting connection with the valve stem for moving the same between said one and said other positions in a predetermined sequence, a gear means connected to the cam means and having means for providing an idler, a constant running synchronous timing motor, a continuously driven rotating timing mechanism operatively connected to the timing motor, indexing means operatively connected to the timing mechanism for continuous movement and engaged with said idler in ordinary position of the cam means whereby the cam means remains stationary and the valve stem in said one position, and means on the timing mechanism responsive to a preselected time thereof for advancing the cam means from said ordinary position and engaging the indexing means with the gear teeth for driving the cam means through a timed cycle whereby the timing motor moves the valve stem from said one position to said other position and back to said one position, said valve stem arranged for closing the first port valve means prior to the closing of said third and fifth chamber valve means for restoring normal pressure in said second, third, fourth, and fifth chambers thereby permitting flow through said ejector and said sixth and seventh chambers for refilling the regenerant tank, and means for varying the time for closing said fifth port valve means after closing the first port valve means, thereby varying the time for refill of the regenerant tank.

2. A flow control apparatus including a valve body having means defining first, second, third, fourth, and fifth chambers; a drain passage communicating with said first chamber, a fluid outlet passage communicating with said second chamber and adapted for connecting to a treatment tank, a fluid inlet passage communicating with said third chamber, a service outlet communicating with said fourth chamber, a treater fluid inlet communicating with said fifth chamber; an ejector having an inlet communicating with said fourth chamber and an outlet communicating with said fifth chamber; first, second, third, and fourth ports in substantially axial alignment and providing communication between said first and second chambers, between said second and third chambers, between said third and fourth chambers, and between said fourth and fifth chambers, respectively; a valve stem passing through said ports and extending outside of said body, valve means on the valve stem for blocking flow through said first port when the valve stem is in one position and for permitting flow therethrough when the valve stem is in another position, third chamber valve means on the valve stem for blocking flow through said third port when the valve stem is in said one position and for blocking flow through said second port when the valve stem is in said other position, a fourth port valve means disposed around said valve stem and movable relative thereto for permitting flow from said fifth chamber to said third chamber and for preventing flow in the opposite direction; a rotatable cam means, a cam follower means having a motion transmitting connection with the valve element for moving the same between said one and said other position, a gear means connected to the cam means and having means for providing an idler, a constant running synchronous timing motor, a continuously driven rotating timing mechanism operatively connected to the timing motor, indexing means operatively connected to the timing mechanism for continuous movement and engaged with said idler in ordinary position of the cam means whereby said cam means remains stationary, and means on the timing mechanism responsive to a preselected time thereof for advancing the cam means from said ordinary position and engaging the indexing means with the gear teeth for driving the cam means through a cycle whereby the timing motor moves the valve stem from said one position to said other position and back to said one position in timed sequence.

3. In a fluid treatment system including a valve connectable with a treatment tank, an ejector communicating with said valve, and a regenerant tank, the improvement comprising: a regenerant valve having a body, first and second chambers in the body, first conduit means connecting said first chamber to said ejector, second conduit means connecting said second chamber with said regenerant tank, a port providing communication between said chambers, a stem passing through said port and extending outside said body, valve means for preventing flow through said port when said stem is in one position, actuating means for moving said stem from said one position at a preselected time for allowing said ejector to withdraw regenerant from the regenerant tank and for permitting refill of the regenerant tank through said conduits, said actuating means operative to return the stem to said one position at a preselected time thereby controlling the refill of the regenerant tank, and means for selectively varying the location of the port relative to the stem to vary the return of said stem and thereby vary the amount of refill of the regenerant tank.

4. In a fluid treatment system including a valve connectable with a treatment tank, an ejector communicating with said valve, and a regenerant tank, the improvement comprising a regenerant valve including a body having a cavity therein, first conduit means connecting said cavity to said ejector, a member adjustably mounted in said cavity, a chamber in said member and second conduit means connecting said chamber to the regenerant tank, a port in said member for communicating the chamber with said cavity, a stem passing through said port and extending outside said body in axial alignment with said member, valve means engageable with said stem in one position for preventing flow through the port, actuating means connected to the stem for moving the same from said one position at a preselected time for allowing the ejector to withdraw regenerant from the regenerant tank, means for supplying fluid through said conduits to said regenerant tank after withdrawal of regenerant therefrom, said actuating means operative to return the stem to said one position to stop refill of the regenerant tank, and said member adjustable in said cavity for varying the position of the valve means relative to said stem thereby varying the time that said stem returns to said one position and varying the quantity of fluid supplied to the regenerant tank.

5. In a fluid treatment system, a flow control apparatus comprising a casing means defining first, second, third, fourth, fifth, sixth and seventh chambers; a drain passage communicating with said first chamber, a fluid outlet passage communicating with said second chamber and adapted for connecting to a treatment tank, a fluid inlet passage communicating with said third chamber, a service outlet communicating with said fourth chamber, a treated fluid inlet communicating with said fifth chamber, an ejector having an inlet communicating with said fourth chamber and an outlet communicating with said fifth chamber, a regenerant inlet communicating with said seventh chamber and adapted for connecting to a regenerant tank, a regenerant outlet communicating with said sixth chamber and having means communicating with said ejector; first, second, and third ports in substantially axial alignment and providing communication between said first and second chambers, between said second and third chambers and said third and fourth chambers, respectively; a fourth port providing communication between said fourth and fifth chambers and having valve means for permitting flow from said fifth chamber to said fourth chamber and for preventing flow in the opposite direction; a fifth port providing communication between said sixth and seventh chambers and having valve means closed in one position and open in another position to permit flow between said chambers; a valve stem passing through said first and second ports and extending outside the casing, a third chamber valve means on the valve stem for blocking flow through said third port when the valve stem is in one position and for blocking flow through said second port when the valve stem is in another position, first port valve means for blocking flow through said first port when the valve stem is in said one position and for permitting flow therethrough when the valve stem is in said other position; and means for simultaneously moving the valve stem and said fifth port valve means between their respective said one position for treatment of the fluid and said other position for regeneration of the tank.

6. The combination of claim 5 including means for closing the first port valve means prior to the closing of said third chamber valve means and said fifth chamber valve means for restoring normal pressure in said second, third, fourth and fifth chambers and for permitting flow through said ejector and said sixth and seventh chambers for refilling the regenerant tank.

7. The combination of claim 6 including means for controlling the time for closing said fifth port valve means after closing the first port valve means thereby timing the refill of the regenerant tank.

8. The combination of claim 5 wherein said fifth port is substantially coaxial with said first, second, and third ports; and wherein the fifth port valve means includes a resilient member engaged with said fifth port and operable to prevent flow through the fifth port when the valve stem is in said one position and to permit flow therethrough when the valve stem is in said other position.

9. The combination of claim 8 wherein said valve stem passes through the fifth port when in said one position and is withdrawn therefrom in said other position and including means for adjusting the position of said fifth port relative to the valve stem thereby varying the time that said valve stem engages the resilient member.

10. A multiport valve for use in a fluid treatment system having a fluid treatment bed and comprising a casing having means defining first, second, third, fourth, and fifth chambers; a drain passage communicating with said first chamber, a fluid outlet passage communicating with said second chamber and adapted for connecting to a treatment tank, a fluid inlet passage communicating with said third chamber, a service outlet communicating with said fourth chamber, and a treated fluid inlet communicating with said fifth chamber and adapted for connecting to the treatment tank; an ejector having an inlet communicating with said fourth chamber and an outlet communicating with said fifth chamber; first, second, and third ports in substantially axial alignment and providing communication between said first and second chambers, between said second and third chambers, and between said third and fourth chambers, respectively; a fourth port providing communication between said fourth and fifth chambers and having check valve means for permitting flow from said fifth chamber to said fourth chamber and for preventing flow in the opposite direction; a valve stem extending through said first and second ports and extending outside of said casing, third chamber valve means on the valve stem for blocking flow through said third port when the valve stem is in one position and for blocking flow through said second port when the valve stem is in another position, first port valve means on the valve stem for blocking flow through said first port when the valve stem is in said one position and for permitting flow therethrough when the valve stem is in said other position, and means for moving the valve stem between said one position for flow of fluid to the bed for treatment and said other position for regeneration of the bed.

11. The apparatus of claim 10 wherein the first port valve means is closed prior to movement of the third chamber valve means away from position blocking flow through said second port when the valve stem is moved from said other to said one position, and wherein the means for moving the valve stem is arranged for effecting relatively slow movement thereof for permitting substantial equalization of pressure on either side of the third chamber valve means after closing of the first port valve means.

12. The combination of claim 10 wherein said third chamber valve means comprises a resilient member mounted on said valve stem, spring means for urging the member to said one position, and means on the valve stem for moving the body to said other position when the valve stem is moved, and wherein said first port valve means includes a resilient member mounted in said first port for engaging the valve stem when in said one position and a bypass means on the valve stem for permitting flow past said resilient member when the valve stem is in said other position.

13. The combination of claim 10 wherein said fluid outlet passage and said treated fluid inlet have openings in juxtaposition and said casing includes a threaded cap extending around said openings and adapted for connecting to a treatment tank whereby the fluid outlet passage and treated fluid inlet are connected to the tank in a single connection, and including a conduit communicating with said treated fluid inlet opening and extending into the treatment tank.

14. A multiport valve for use in a fluid treatment system and comprising a casing having means defining first, second, third, fourth, and fifth chambers; a drain passage communicating with said first chamber, a fluid outlet passage communicating with said second chamber and adapted for connecting to a treatment tank, a fluid inlet passage communicating with said third chamber, a service outlet communicating with said fourth chamber, and a treated fluid inlet communicating with said fifth chamber; an ejector having an inlet communicating with said fourth chamber and an outlet communicating with said fifth chamber; first, second, third and fourth ports in substantially axial alignment and providing communication between said first and second chambers, between said second and third chamber, between said third and fourth chambers, and between said fourth and fifth chambers, respectively; a valve stem passing through said ports and extending outside of said casing, valve means on the valve stem for blocking flow through said first port when the valve stem is in one position and for permitting flow therethrough when the valve stem is in another position, third chamber valve means on the valve stem for blocking flow through said third port when the valve stem is in said one position and for blocking flow through said second port when the valve stem is in said other position, fourth port valve means disposed around said valve stem and movable relative thereto for permitting flow from said fifth chamber to said fourth chamber and for preventing flow in the opposite direction; spring means for urging said fourth port valve means to closed position; and means for moving the valve stem between said one position and said other position.

15. A flow control apparatus for controlling a sequence of flows in a water treatment apparatus and comprising a multiport valve mechanism having a main valve body and a valve element movable longitudinally in the body between two extreme positions to control a plurality of flows through the valve during such movement, a program clock comprising a continuously running synchronous motor and time indicating means rotatably driven thereby for sequentially indicating a plurality of consecutive days and the time of day, mechanical drive means interposed between the time indicating means and the valve element and connected to the valve element for driving the valve element from one position to the other and return, and means presettable with respect to the timing means to a selected day and time as indicated by the time indicating means for periodically engaging the time indicating means with the mechanical drive means at preselected positions in its rotation to drive the valve element between its positions in timed sequence through an interval of time representing a fraction of a day as indicated by the time indicating means.

16. The combination of claim 15 wherein the valve body includes a fluid inlet chamber, a fluid outlet chamber adapted for connecting to a fluid treatment tank, a treated fluid inlet chamber adapted for connecting to said tank, a service outlet chamber, and a drain port; said valve body having a port communicating said fluid inlet and fluid outlet chambers, a port communicating said fluid inlet and service outlet chambers, and means communicating said fluid outlet chamber with said drain port; and wherein the valve element includes a valve stem passing through the port communicating said fluid inlet and fluid outlet chambers, first valve means mounted on the valve stem for preventing flow through said port communicating said fluid inlet and service outlet chambers when the valve stem is in a first position and for preventing flow through said port communicating said fluid inlet and fluid outlet chambers when the valve stem is in a second position, said valve stem having means for preventing flow from said fluid outlet chamber to the drain port when in said first position and for permitting such flow when in said second position; said valve body including an ejector having an inlet communicating with said service outlet chamber and an outlet communicating with said treated fluid inlet chamber, and valve means operable to permit flow from said treated fluid inlet chamber to said service outlet chamber and to prevent flow in the opposite direction; said apparatus operable to pass fluid from the fluid inlet chamber through the fluid outlet chamber to said tank and from the tank through the treated fluid inlet chamber to the service outlet chamber when the valve element is in said first position, and when the valve element is in said second position operable to pass fluid from the fluid inlet chamber to the service outlet chamber and therefrom through the ejector and the treated fluid inlet chamber to the tank, and from the tank through the fluid outlet chamber to the drain port.

17. A flow control apparatus including a two-position multiport valve having a valve element slowly movable between only a service position and a regenerant position; a regenerant line connected to the multiport valve; regenerant valve means interposed in the regenerant line for controlling flow therethrough and operative to open and close in response to movement of the valve element between said two positions to control flow through the regenerant line; mechanical drive means connected to the valve element for moving the same between said two positions; and a program clock including time indicating means for indicating a plurality of days and the time of day, presettable means for periodically engaging the time indicating means with the mechanical drive means, a combination timing and valve element drive synchronous motor adapted for continuous running, said combination motor for continuously driving the time indicating means and for periodically driving the mechanical drive means through a cycle to move the valve element from service position to the regenerant position and back to service position, whereby the combination motor serves as a prime move for both the continuous timing and the periodic moving of the valve element.

18. In a water treatment apparatus including a treatment tank and a regenerant tank, a flow control apparatus for controlling a sequence of flows therein and comprising: a multiport valve mechanism having a valve body and a valve element therein extending outside the body; the valve body having a raw water inlet, a service outlet, a regenerant inlet adapted for connection to the regenerant tank, and first and second passages adapted for connection to the treatment tank; the valve element slowly movable longitudinally in the body between a service position for passing flow from the raw water inlet to the first passage and from the second passage to the outlet, and a regenerant position for passing a regenerant fluid from the regenerant inlet to one of said passages; a program clock comprising a continuously running synchronous motor and time indicating means continuously and rotatably driven thereby for indicating the time of day a rotatable cam having an internal cam track; a cam follower engaged with the cam track and having a motion transmitting connection to the valve element; means continuously driven by the synchronous motor for periodically rotating the cam continuously through a cycle representing a fraction of a day as indicated by the time indicating means to move the valve element from service position to regenerant position and back to service position; said cam track providing a dwell of the valve element in the regenerant position for a period of time while the cam is rotated to effectuate regeneration of the treatment tank; and means responsive to a preselected time of day for starting said cycle; whereby the synchronous motor serves as the prime mover of both the continuous timing and the periodic movement of the valve element.

19. In a water treatment apparatus including a treatment tank and a regenerant tank, a flow control apparatus for controlling a sequence of flows therein and comprising: a multiport valve mechanism having a valve body and a valve element therein extending outside the body; the valve body having a raw water inlet, a service outlet, a regenerant inlet adapted for connection to the regenerant tank, and first and second passages adapted for connection to the treatment tank; the valve element slowly movable longitudinally in the body between a service position for passing flow from the raw water inlet to the first passage and from the second passage to the outlet, and a regenerant position for passing a regenerant fluid from the regenerant inlet to one of said passages; a rotatable cam; a cam follower engaged with the cam and having a motion transmitting connection to the valve element for moving the same between said positions in response to rotation of the cam; a gear connected to the cam and having teeth and means for providing an idler; a continuously running timing motor; a timing mechanism continuously driven by the timing motor; indexing means operatively connected to the timing mechanism for substantially continuous movement and engaged with the idler; and means on the timing mechanism responsive to a preselected time thereof for advancing the cam means to engage the indexing means with the gear teeth and drive the cam through a cycle to move the valve element between said positions in timed sequence.

20. In a flow control system for use with a water treatment apparatus having a treatment tank and a regenerant tank, the combination comprising: an ejector having an ejector inlet, a regenerant inlet, and an ejector outlet; a multiport valve connected to the ejector inlet and outlet and having a raw water inlet, a treated water outlet, a drain outlet, first and second tank connecting passages adapted for connection to the treatment tank, and a valve element slowly movable between a service position and a regenerant position for regeneration of the treatment tank; the valve element operable in the service position to pass raw water from the raw water inlet to the first tank connecting passage and to pass treated water from the second tank connecting passage to the treated water outlet, and operable in the regenerant position to pass raw water from the raw water inlet to the ejector inlet and from the ejector outlet to the second tank connecting passage;
 a regenerant valve connected to the regenerant tank and to the regenerant inlet of the ejector and operative to open in the regenerant position of the multiport valve to allow flow to the ejector;
 mechanical drive means connected to the valve element for moving the same between its positions; and
 a program clock comprising: time indicating means for sequentially indicating a plurality of consecutive days and the time of day, presettable means for periodically engaging the time indicating means with the mechanical drive means, and a combination timing and valve element drive synchronous motor adapted for continuous running, said combination motor for continuously driving the time indicating means and for periodically driving the mechanical drive means through a cycle to move the valve element from its service position to the regenerant position and back to service position for regeneration of the treatment tank, the combination motor continuously driving the mechanical drive means during said cycle, whereby the combination motor serves as a prime mover for both the continuous timing and the periodic regeneration.

21. A multiport valve for use in a fluid treatment system having a fluid treatment tank and comprising: a valve body having at least first, second, third, and fourth chambers; a drain passage communicating with the first chamber, a fluid outlet passage communicating with the second chamber and adapted for connection to the treatment tank, a fluid outlet passage communicating with the third chamber, and a service outlet and a treated fluid inlet communicating with the fourth chamber; first, second, and third ports in generally axial alignment and providing communication between the first and second chambers, the second and third chambers, and the third and fourth chambers, respectively; a valve stem extending through the first and second ports and extending outside the valve body, third chamber valve means on the valve stem for blocking flow through the third port when the valve stem is in service position and for blocking flow through the second port when the valve stem is in regenerant position, said third chamber valve means movable a limited distance relative to the valve stem, and first port valve means on the valve stem for blocking flow through the first port when the valve stem is in said service position and for permitting flow therethrough to the drain passage when the valve stem is in said regenerant position; and means for moving the valve stem to the regenerant position to start movement of the third chamber valve means toward the second port prior to opening the first port valve means, and for returning the valve stem to the service position to close the first port valve means prior to blocking of flow through the third port by the third chamber valve means.

References Cited

UNITED STATES PATENTS

| | | | |
|---|---|---|---|
| 1,707,692 | 4/1929 | Terbeest | 210—191 |
| 3,225,789 | 12/1965 | Thompson | 137—604 |
| 3,237,640 | 3/1966 | Whitlock et al. | 137—624.18 |
| 3,248,493 | 4/1966 | Bassett | 200—39 |
| 3,249,122 | 5/1966 | Fleckenstein et al. | 137—625.29 |

ALAN COHAN, Primary Examiner

U.S. Cl. X.R.

137—625.5, 625.29